(12) United States Patent
Zahoransky et al.

(10) Patent No.: US 9,726,081 B2
(45) Date of Patent: Aug. 8, 2017

(54) EXHAUST-GAS TURBOCHARGER

(71) Applicant: BorgWarner Inc., Auburn Hills, MI (US)

(72) Inventors: Raduz Zahoransky, Marnheim (DE); Ralf Christmann, Kaiserslautern (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/904,772

(22) PCT Filed: Jul. 15, 2014

(86) PCT No.: PCT/US2014/046651
§ 371 (c)(1),
(2) Date: Jan. 13, 2016

(87) PCT Pub. No.: WO2015/009697
PCT Pub. Date: Jan. 22, 2015

(65) Prior Publication Data
US 2016/0153357 A1 Jun. 2, 2016

(30) Foreign Application Priority Data
Jul. 19, 2013 (DE) .................. 10 2013 214 193

(51) Int. Cl.
*F02B 33/00* (2006.01)
*F02C 6/12* (2006.01)
(Continued)

(52) U.S. Cl.
CPC .............. *F02C 6/12* (2013.01); *F02B 37/186* (2013.01); *F02B 37/24* (2013.01); *F02C 9/16* (2013.01);
(Continued)

(58) Field of Classification Search
CPC .................... F02B 37/18–37/186; F02B 37/24
(Continued)

(56) References Cited

U.S. PATENT DOCUMENTS

2003/0074898 A1* 4/2003 McEwen ................ F02B 37/186
60/602
2006/0137645 A1 6/2006 Friedrich
(Continued)

FOREIGN PATENT DOCUMENTS

DE 102010023050 A1 * 12/2011 .............. F02B 37/24
DE 102012204497 A1 * 9/2013 ............ F02B 37/186
(Continued)

OTHER PUBLICATIONS

Machine generated translation of DE 102012204497 A1.*
(Continued)

*Primary Examiner* — Phutthiwat Wongwian
*Assistant Examiner* — Ngoc T Nguyen
(74) *Attorney, Agent, or Firm* — Eric L. Doyle; Stephan A. Pendorf; Patent Central LLC

(57) ABSTRACT

An exhaust-gas turbocharger having a compressor with a compressor wheel, a turbine with a turbine wheel, a shaft on which the compressor wheel and the turbine wheel are arranged, a control rod for actuating an adjustment apparatus of the exhaust-gas turbocharger, and an actuator for moving the control rod. A damping apparatus with an elastic element is fixedly connected to the control rod and projects in two opposite directions from the control rod.

10 Claims, 5 Drawing Sheets

(51) Int. Cl.
*F02B 37/18* (2006.01)
*F02B 37/24* (2006.01)
*F02C 9/16* (2006.01)

(52) U.S. Cl.
CPC ......... *F05D 2220/40* (2013.01); *Y02T 10/144* (2013.01)

(58) Field of Classification Search
USPC .......................................................... 60/602
See application file for complete search history.

(56) References Cited

U.S. PATENT DOCUMENTS

| | | | |
|---|---|---|---|
| 2010/0011764 A1* | 1/2010 | Andrews | ............... F01D 17/085 60/602 |
| 2010/0172707 A1 | 7/2010 | Tokawa et al. | |
| 2012/0055154 A1 | 3/2012 | Ebert | |
| 2013/0011243 A1* | 1/2013 | Alajbegovic | ......... F02B 37/186 415/144 |

FOREIGN PATENT DOCUMENTS

| | | | | |
|---|---|---|---|---|
| DE | 102012024509 A1 | * | 6/2014 | ............ F02B 37/186 |
| DE | EP 2317095 B1 | * | 7/2015 | ............. F01D 17/20 |
| EP | 1256703 B1 | | 12/2004 | |
| JP | 2015094283 A | * | 5/2015 | |
| KR | 20060037719 A | | 5/2006 | |
| WO | WO 2013165719 A1 | * | 11/2013 | .............. F02B 37/12 |

OTHER PUBLICATIONS

Machine generated translation of EP EP 2317095 B1.*
International Search Report in International Application No. PCT/US2014/046651 dated Nov. 12, 2014.

* cited by examiner

EXHAUST-GAS TURBOCHARGER

BACKGROUND OF THE INVENTION

Field of the Invention

The invention relates to an exhaust-gas turbocharger.

Description of the Related Art

In exhaust-gas turbochargers, there are numerous adjustment apparatuses: One possible adjustment apparatus serves for the charge pressure regulating device. Said charge pressure regulating device may for example be in the form of a slide or a flap. A second example of an adjustment apparatus is a so-called variable turbine geometry. In this case, multiple vanes in the inlet region of the turbine are adjusted in order thereby to vary the geometry. The various adjustment apparatuses are in each case moved by means of a control rod and an actuator. Corresponding vibrations arise in the control rod, leading to increased wear of the adjoining components.

It is an object of the present invention to provide an exhaust-gas turbocharger which, while being inexpensive to produce, can be operated with low maintenance and in an operationally reliable manner.

BRIEF SUMMARY OF THE INVENTION

According to the invention, it has been identified that the vibrations in the control rod should be dampened. To find an expedient and operationally reliable method here, it is proposed that an elastic element, if appropriate with weights, be mounted on the control rod.

The damping apparatus according to the invention does not imperatively act as a classic damper but shifts at least the natural frequency of the control rod, such that the vibrations in the control rod can be positively influenced by means of the damping apparatus.

The elastic element projects from the control rod, in particular perpendicularly, in two opposite directions. Weights are preferably mounted on the ends of the elastic element. Here, it may be provided that the weights, as separate components, are connected to the elastic element. As an alternative to this, provision is also made for the elastic element itself to be of thickened form at its ends, such that the thickened ends of the elastic element act as weights. It is furthermore possible to utilize the inherent weight of the elastic element and, if appropriate, omit the weight on the ends of the elastic element.

The weights are selected in accordance with the desired influence to be exerted on the vibration behavior of the control rod. Furthermore, the distance of the respective weight from the control rod is also selected correspondingly. In this regard, it is also possible for the two opposite weights to be at different distances from the control rod. Furthermore, an angled arrangement of the elastic elements relative to the control rod is possible in order to accommodate the damping apparatus in constricted space conditions.

The damping apparatus is used on the control rod for the charge pressure regulating device. Said charge pressure regulating device is in particular in the form of a flap (for example wastegate flap) or slide. Furthermore, provision is preferably made for the damping apparatus to be used on a control rod which controls the variable turbine geometry of the exhaust-gas turbocharger.

BRIEF DESCRIPTION OF THE SEVERAL VIEWS OF THE DRAWINGS

Further details, advantages and features of the invention can be found in the following description of exemplary embodiments with reference to the drawing, in which.

DETAILED DESCRIPTION OF THE INVENTION

Figure 1:
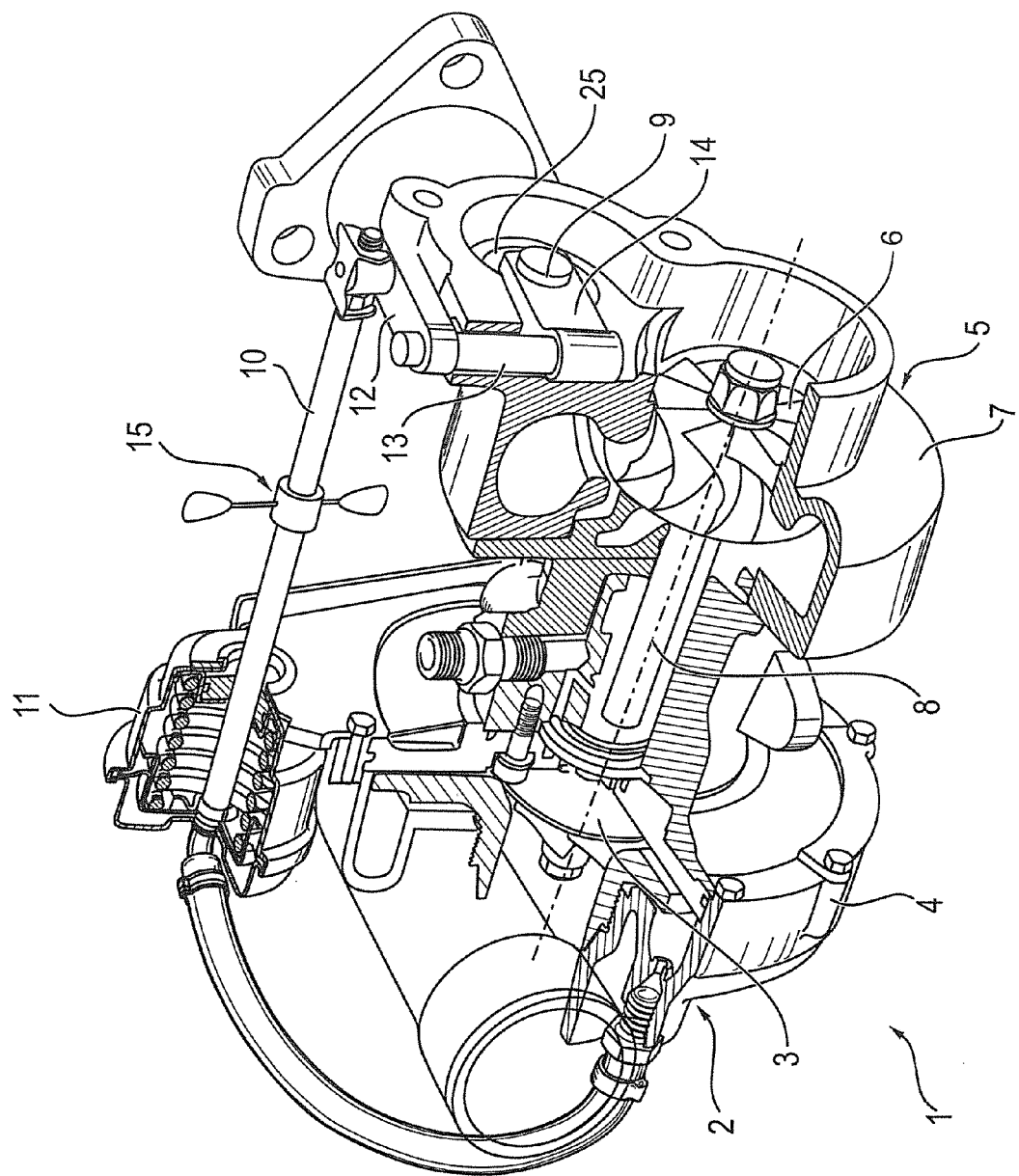
FIG. 1 is a schematically simplified illustration of an exhaust-gas turbocharger according to the invention as per a first exemplary embodiment.

Identical or functionally identical components are denoted by the same reference numerals in all of the exemplary embodiments.

FIG. 1 shows an exhaust-gas turbocharger 1 in a schematically simplified, partially cut-away view. The exhaust-gas turbocharger 1 comprises a compressor 2 with a compressor wheel 3 and with a compressor housing 4. Furthermore, the exhaust-gas turbocharger 1 comprises a turbine 5 with a turbine wheel 6 which is accommodated in a turbine housing 7. The compressor wheel 3 is connected to the turbine wheel 6 by way of a shaft 8.

As a result of the turbine wheel 6 being impinged on by a flow of exhaust gas, the shaft 8 is set in rotation and, as a result, charge air is compressed by means of the compressor 2.

The illustration in FIG. 1 also shows an adjustment apparatus 9. The adjustment apparatus 9 is, in the first exemplary embodiment, in the form of a charge-pressure regulation means. In particular, the adjustment apparatus comprises a flap 25 (also: wastegate flap) for this purpose.

Figure 5:
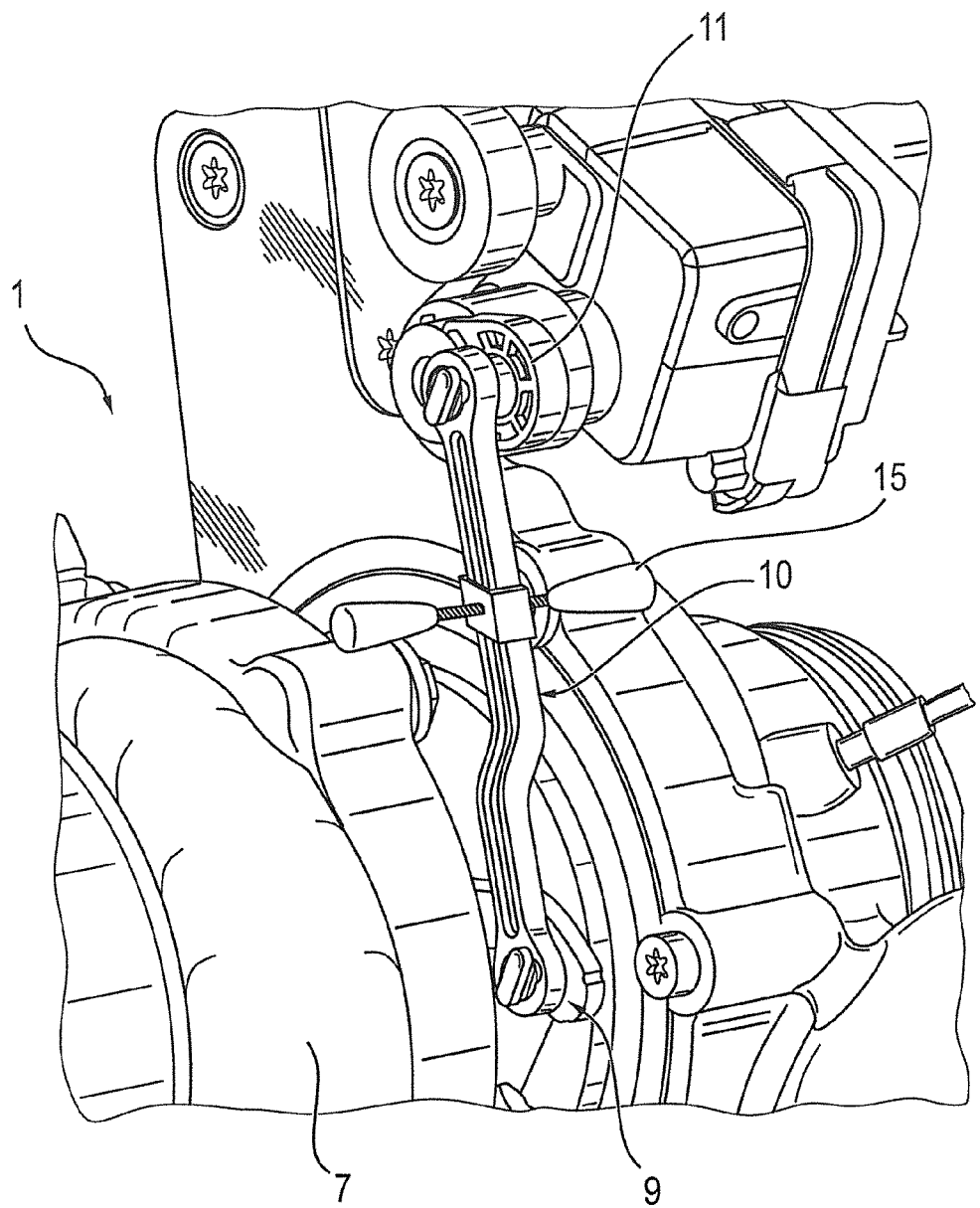
FIG. 5 is a schematically simplified illustration of the exhaust-gas turbocharger according to the invention as per a third exemplary embodiment.

The exhaust-gas turbocharger 1 comprises an actuator 11 which, in the exemplary embodiment illustrated, is controlled by means of compressed air. Electrically driven actuators may likewise be used, as shown in FIG. 5. The actuator 11 moves a control rod 10. The control rod 10 is connected to a first lever 12. The first lever 12 is connected by way of a journal 13 to a second lever 14. The second lever 14 in turn moves the flap 25 of the adjustment apparatus 9.

FIG. 1 shows a damping apparatus 15 on the control rod 10 in a highly simplified schematic illustration. Said damping apparatus 15 is shown in detail in FIG. 2.

Figure 2:
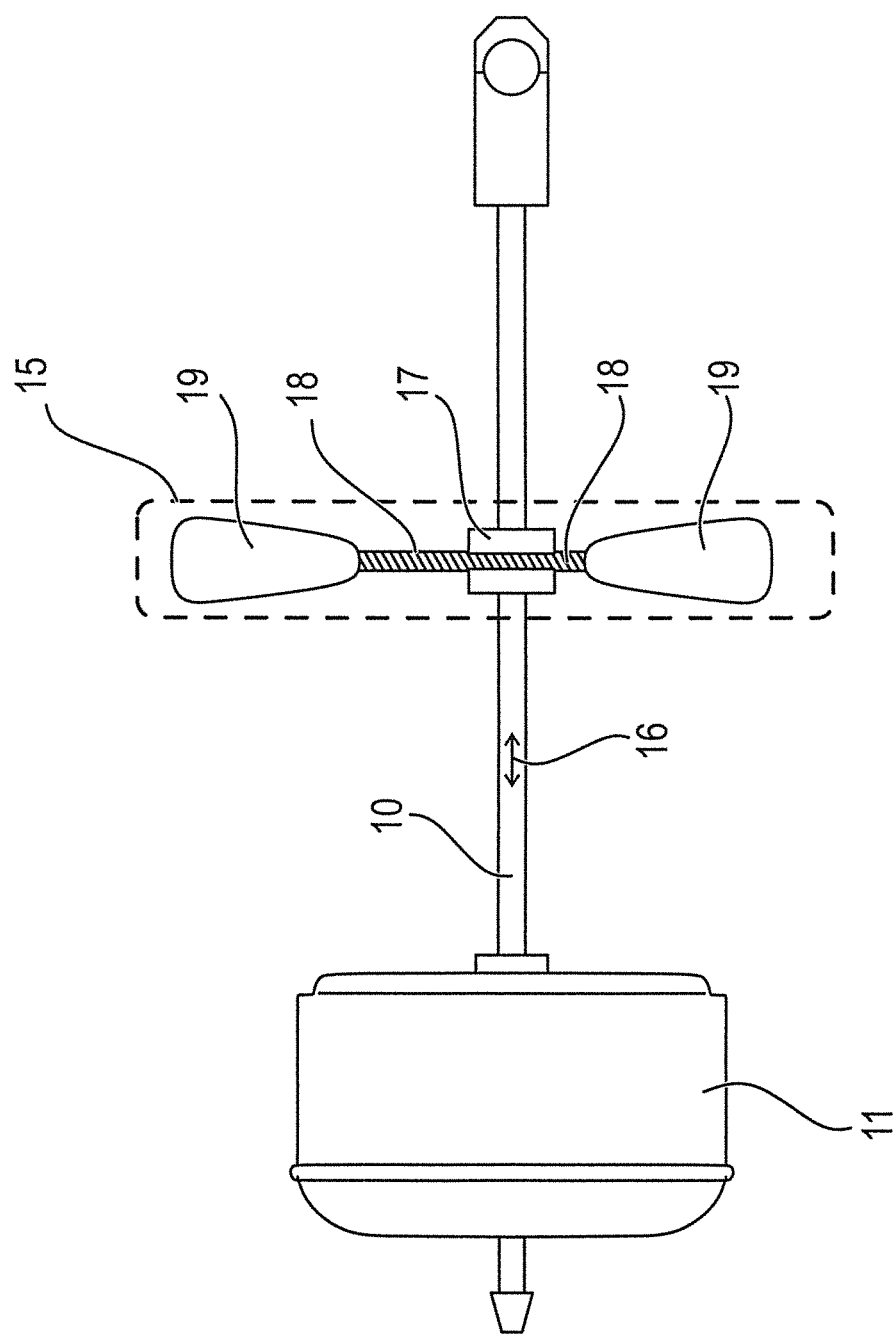
FIG. 2 shows a detail from FIG. 1.

FIG. 2 shows a detail from FIG. 1. A movement 16, which is to be damped, of the control rod 10 is shown. The damping apparatus 15 is used for damping said movement 16. The damping apparatus 15 comprises an elastic element 18 in the form of a wire cable. The wire cable may have a thickness of, for example, 1 mm to 10 mm, preferably of 2 mm to 7 mm. The wire cable has inherent damping characteristics. The damping characteristics result from internal friction between a multiplicity of wires from which the wire cables are constructed. The elastic element 18 is connected to the control rod 10 by way of a fastening element 17, for example a bushing. The elastic element 18 projects from the control rod 10 in two opposite directions.

In each case one weight 19 is provided on the ends of the elastic element 18.

Figure 3:
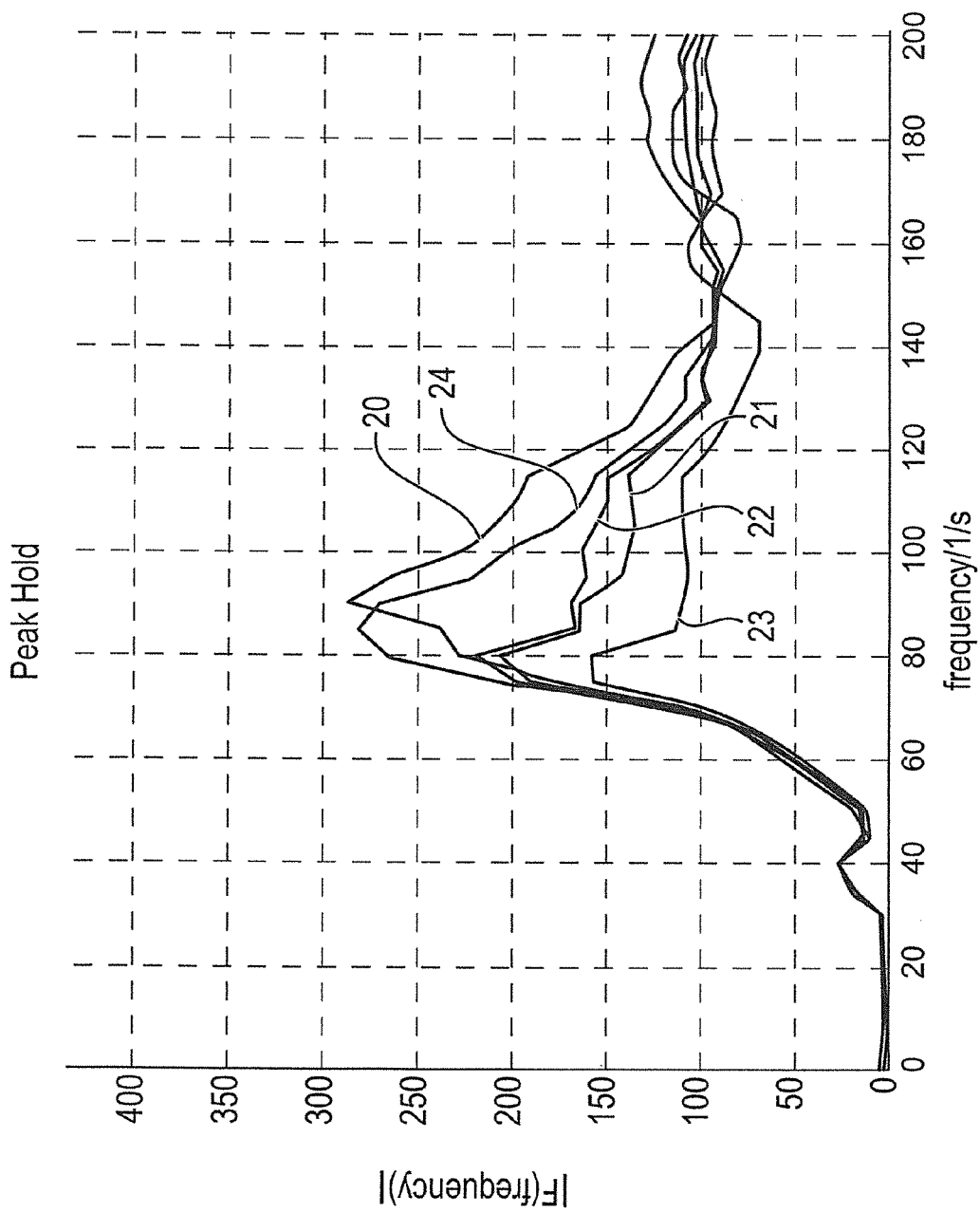
FIG. 3 shows test results relating to the exhaust-gas turbocharger according to the invention as per the first exemplary embodiment.

FIG. 3 shows the frequency analysis from a test on a test stand. In the test, the exhaust-gas turbocharger 1 as per the first exemplary embodiment was tested on an internal combustion engine. Here, the vibration in the control rod 10 was determined in the case of five different designs of the damping apparatus 15.

The first profile 20 was recorded without a damping apparatus 15. The second profile 21 was determined using a thin elastic element 18 with two weights 19. The third profile 22 was determined using a damping apparatus 15 with a thin elastic element 18 without weights 19. The fourth profile 23 shows the result using a thick elastic element 18 with two weights 19. The fifth profile 24 was determined using a thick elastic element 18 without weights 19.

From the profiles 23 and 21, it can be seen very clearly that a considerable reduction of a vibration amplitude in natural frequency ranges can be realized using a damping apparatus 15 with elastic element 18 and with weights 19.

However, the profile 22 also shows that, with a corresponding design of the elastic element 18, a positive effect can be achieved even without the use of weights 19.

Figure 4:
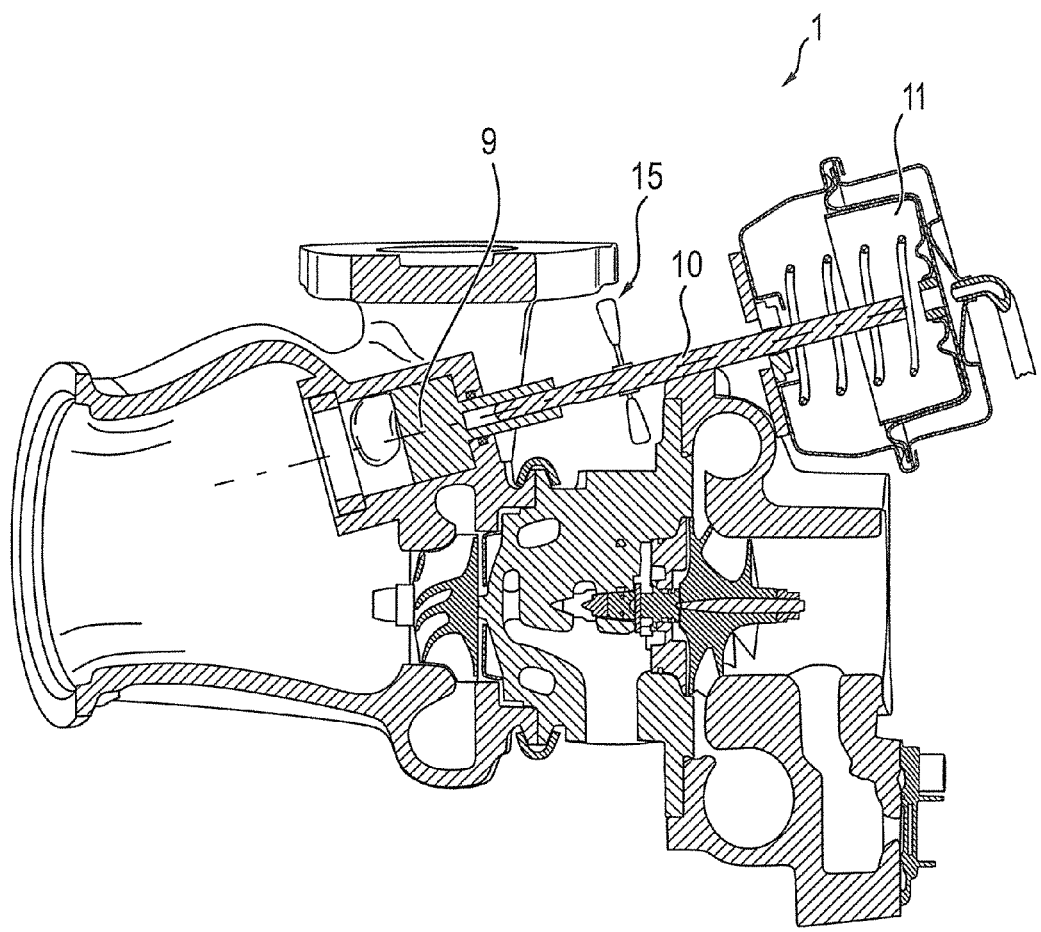
FIG. 4 is a schematically simplified illustration of the exhaust-gas turbocharger according to the invention as per a second exemplary embodiment.

FIG. 4 shows an exhaust-gas turbocharger 1 as per the second exemplary embodiment in a highly simplified illustration. In the second exemplary embodiment, the adjustment apparatus 9 is likewise in the form of a charge-pressure regulation means. Here, however, a slide is provided rather than a flap. Again, a control rod 10 is used which is moved by means of an actuator 11. By means of the damping apparatus 15 according to the invention, the vibration amplitude in the longitudinal direction of the control rod 10 can be reduced in certain frequency ranges that arise during operation.

FIG. 5 shows the exhaust-gas turbocharger 1 as per the third exemplary embodiment in a highly simplified illustration. In the third exemplary embodiment, the adjustment apparatus 9 is in the form of a variable turbine geometry device. The vanes in the intake region of the turbine 5 are adjusted by means of the control rod 10 and the actuator 11. The damping apparatus 15 may in turn also be used here.

In addition to the above written disclosure of the invention, reference is hereby explicitly made, for additional disclosure thereof, to the diagrammatic illustration of the invention in FIGS. 1 to 5.

LIST OF REFERENCE SIGNS

1 Exhaust-gas turbocharger
2 Compressor
3 Compressor wheel
4 Compressor housing
5 Turbine
6 Turbine wheel
7 Turbine housing
8 Shaft
9 Adjustment apparatus
10 Control rod
11 Actuator
12 First lever
13 Journal
14 Second lever
15 Damping apparatus
16 Movement
17 Fastening element
18 Elastic element
19 Weights
20 to 24 Profiles
25 Shut-off element

The invention claimed is:

1. An exhaust-gas turbocharger (1) comprising:
a compressor (2) with a compressor wheel (3),
a turbine (5) with a turbine wheel (6),
a control rod (10) for actuating an adjustment apparatus (9) of the exhaust-gas turbocharger (1), and
an actuator (11) for moving the control rod (10),
wherein
a damping apparatus (15) comprising an elastic wire cable having a first end and a second end is fixedly connected to the control rod (10) and projects in two opposite directions from the control rod (10) and wherein a first weight is arranged on the first end of the elastic wire cable, a second weight is arranged on the second end of the elastic wire cable, and the first and second weights (19) are at equal distances from the control rod (10).

2. The exhaust-gas turbocharger as claimed in claim 1, wherein the wire cable has a thickness of 1 mm to 10 mm.

3. The exhaust-gas turbocharger as claimed in claim 1, wherein the adjustment apparatus (9) is a charge pressure regulating device which has a shut-off element (25) which opens or closes a flow opening.

4. The exhaust-gas turbocharger as claimed in claim 3, wherein the shut-off element (25) is a flap or a slide.

5. The exhaust-gas turbocharger as claimed in claim 1, wherein the turbine has an inflow region, and wherein the adjustment apparatus is a variable turbine geometry device in which multiple vanes in the inflow region of the turbine (5) are adjustable.

6. The exhaust-gas turbocharger as claimed in claim 1, wherein the two opposite ends of the elastic wire cable extend away from the control rod (10) at an angle less than 90°.

7. The exhaust-gas turbocharger as claimed in claim 1, wherein the wire cable has a thickness of 2 mm to 7 mm.

8. An exhaust-gas turbocharger (1) comprising:
a compressor (2) with a compressor wheel (3),
a turbine (5) with a turbine wheel (6),
a control rod (10) for actuating an adjustment apparatus (9) of the exhaust-gas turbocharger (1), and
an actuator (11) for moving the control rod (10),
wherein
a damping apparatus (15) with an elastic element (18) having a first end and a second end is fixedly connected to the control rod (10) and projects in two opposite directions from the control rod (10), and wherein a first weight is arranged on the first end of the elastic element (18), a second weight is arranged on the second end of the elastic element (18), and the first and second weights (19) are at different distances from the control rod (10).

9. The exhaust-gas turbocharger as claimed in claim 8, wherein the elastic element (18) is a wire cable, and wherein the wire cable has a thickness of 1 mm to 10 mm.

10. The exhaust-gas turbocharger as claimed in claim 8, wherein the elastic element (18) is a wire cable, and wherein the wire cable has a thickness of 2 mm to 7 mm.

* * * * *